United States Patent [19]
Edmondson

[11] Patent Number: 5,921,338
[45] Date of Patent: Jul. 13, 1999

[54] PERSONAL TRANSPORTER HAVING MULTIPLE INDEPENDENT WHEEL DRIVE

[75] Inventor: Jonathan L. Edmondson, Cashmere, Wash.

[73] Assignees: Robin L. Edmondson; Roger Edmondson, both of Rainier, Wash.

[21] Appl. No.: 08/909,501

[22] Filed: Aug. 11, 1997

[51] Int. Cl.$^6$ .................................................. B60K 1/02
[52] U.S. Cl. .................. 180/65.5; 180/65.1; 180/6.5; 280/124.11; 280/124.111
[58] Field of Search ............................ 180/6.5, 242, 243, 180/65.1, 65.6; 280/124, 106, 124.11, 124.111

[56] References Cited

U.S. PATENT DOCUMENTS

| | | |
|---|---|---|
| 3,194,578 | 7/1965 | Kiecker . |
| 3,273,912 | 9/1966 | Crockett . |
| 3,292,943 | 12/1966 | Crockett ............................ 280/124.111 |
| 3,299,992 | 1/1967 | Traywick . |
| 3,408,089 | 10/1968 | Edwards . |
| 3,605,929 | 9/1971 | Rolland . |
| 3,664,450 | 5/1972 | Udden et al. . |
| 3,720,446 | 3/1973 | Kelley . |
| 3,786,889 | 1/1974 | Kelley . |
| 4,089,384 | 5/1978 | Ehrenberg ............................... 180/65.6 |
| 4,341,278 | 7/1982 | Meyer . |
| 4,570,741 | 2/1986 | McCoy . |
| 4,647,067 | 3/1987 | Paquette et al. ................. 280/124.111 |
| 4,921,263 | 5/1990 | Patin . |
| 5,004,061 | 4/1991 | Andruet . |
| 5,474,315 | 12/1995 | Klas et al. ........................ 280/124.111 |
| 5,482,125 | 1/1996 | Pagett . |
| 5,497,845 | 3/1996 | Shibahata . |
| 5,518,081 | 5/1996 | Thibodeau . |
| 5,711,544 | 1/1998 | Buhl ................................. 280/124.106 |

FOREIGN PATENT DOCUMENTS

| | | |
|---|---|---|
| WO 90/11905 | 10/1990 | WIPO . |
| wO 91/15378 | 10/1991 | WIPO . |

Primary Examiner—Lanna Mai
Assistant Examiner—Michael Cuff
Attorney, Agent, or Firm—Christensen O'Connor PLLC; Johnson & Kindness

[57] ABSTRACT

A multiple wheel drive personal transporter includes a lightweight skeletal frame based on a single cylindrical fore-aft beam to which front and rear axle, motor drive and wheel assemblies are connected. Each wheel is driven by a battery powered electrical motor and transmission gear sprocket chain drive. All wheels, or by user control option just front wheels, are powered on in parallel and energized by PWM drive circuitry. Throttle, forward/reverse, steering and other controls are available on a single flight stick. The seat is mounted over the beam near the rear, with front and rear battery trays and the user's weight distributed for optimum stability and traction and the beam is made of telescoped tubular sections incorporating a seat tilt limiting differential that responds to differential rotation of the front and rear wheel assemblies as the transporter traverses uneven ground.

14 Claims, 16 Drawing Sheets

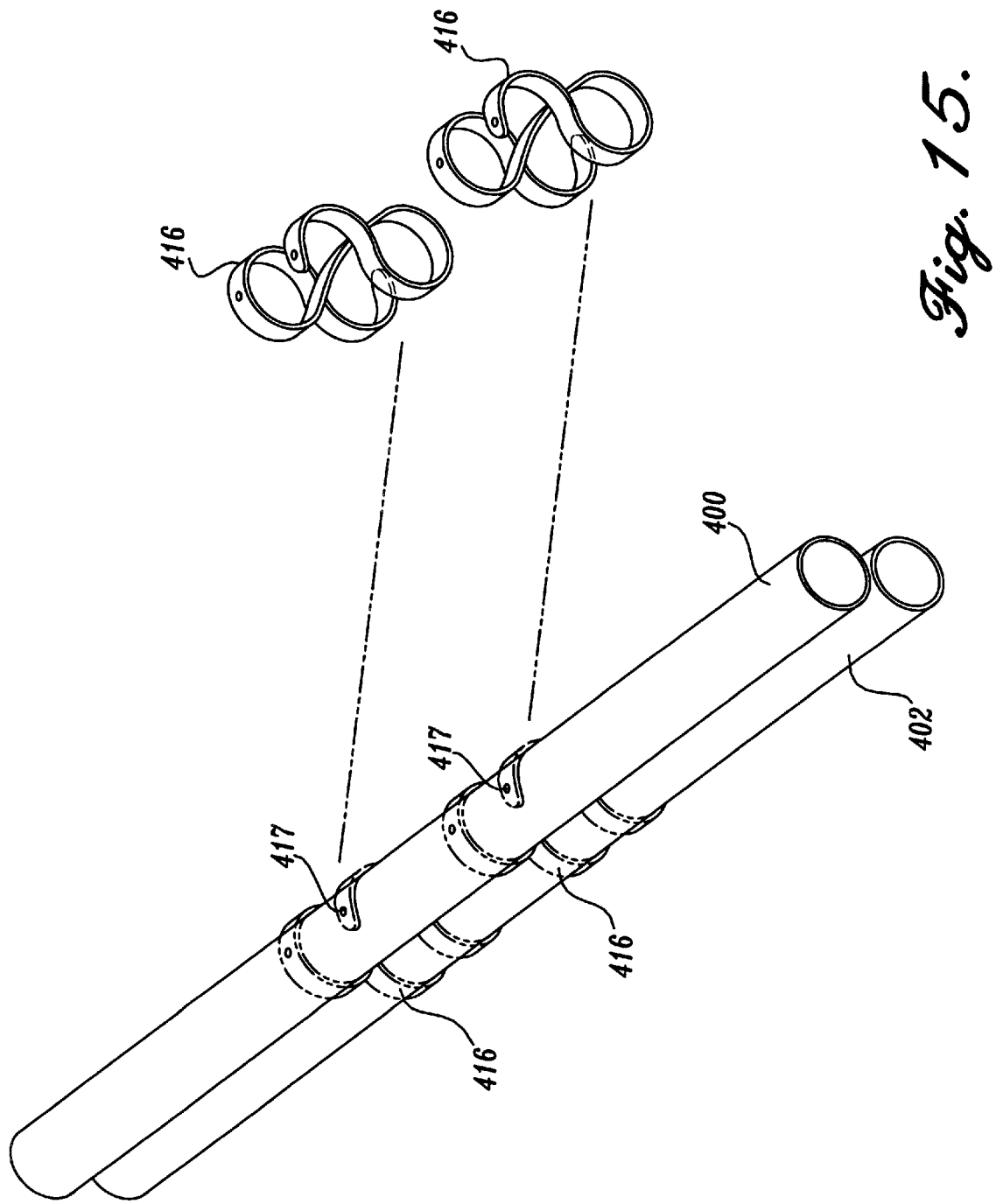

PERSONAL TRANSPORTER HAVING MULTIPLE INDEPENDENT WHEEL DRIVE

FIELD OF THE INVENTION

The invention relates to a powered personal carrier or transporter for travel on and off road such as may be used for recreation, agriculture, or industrial purposes, as well as to extend the mobility of the elderly and others of limited physical ability or endurance or as a mobile powered remote controlled platform or carrier for various equipment and supplies.

BACKGROUND OF THE INVENTION

While there exists a wide variety of off-road recreational, industrial and agricultural working vehicles, none provide the needed combination of features suitable for general purpose applications as well as providing a more versatile transporter for individuals of limited physical endurance and/or ambulation that can be used on and off road and over rough terrain. Battery powered two and three wheel single seat vehicles offer some of the desired aspects such as controllability, quiet operation, and transportability in the owner's van, truck or trailer but are deficient for use on rough terrain, over water hazards, and on steep slopes. To provide for safe, durable, stable and maneuverable operation, a transportation device should have high ground clearance, be of light weight construction, capable of being loaded and unloaded easily by the owner from a larger vehicle such as the back of a van, truck or trailer. The drive mechanism must be such as to deliver power to the wheels independently and yet without the mechanical and weight constraints of drive shafts, differential transmissions and full width axle assemblies. It should be electrically operated to minimize noise, combustion emissions and other characteristics of petroleum based powered engines that would render them inappropriate for the wide variety of uses needed for the above described individuals and purposes including use within buildings or other enclosed areas.

SUMMARY OF THE INVENTION

The invention is embodied in a personal transporter having multiple wheel drive in which the user sits in a position intermediate front and rear wheel assemblies that are held together by a single fore-aft extending centrally positioned beam of telescopically joined tubular beam sections. The beam sections are coaxially rotatable to allow the front and rear wheel assemblies to independently pivot about the beam axis for navigating over uneven ground. In a preferred configuration having a pair of front wheels and a pair of rear wheels, the front drive and wheel assembly includes a battery holding tray and foot rest. The user sits just forward of a rear drive and wheel assembly. Aft of the user's seat is another battery tray so that the user's body weight and batteries effectively distribute the load more evenly on all four wheels for stability and traction.

Also in the preferred embodiment, each wheel is provided with independent electrical motor drive and the electrical throttle power and steering are controlled from a flight stick adjustably mounted on one of the chair arm rests. The flight stick controls preferably include a steering mechanism that is responsive to left and right rotation of the flight stick that translates into front wheel steering movement via an electrical motor driven steering arm, mode selection by switches that provide optional all-wheel or two-wheel drive, the latter for conservation of battery, forward/reverse, and high/low power.

For safety, stability and comfort to the user, the preferred embodiment mounts the single seat directly over the central fore-aft beam and the relatively rotatable coaxial beam sections are joined to a differential mechanism that responds to differential rotation between the front and rear wheel assemblies to minimize side-to-side rotation or sway of the user's seat. Thus, severe tilting or rotation of either the front or rear wheel assemblies due to uneven ground is not translated into corresponding tilt or sway of the seat and the user. Rather, the differential mechanism causes the seat to tilt at a fraction of the differential angular tilt rate of the wheel assemblies.

Still another aspect of the preferred embodiment is the provision of rear wheel adjustable alignment strut assemblies that connect outboard points on the rear wheel and motor drive assemblies to the central beam at about midlength. These strut rods structurally tie together the rear wheel subassembly and beam to allow adjustment of tracking of the rear wheels relative to the front wheels by lengthening or shortening the struts.

To allow for effective, single operator loading and unloading of transporter from a carrier vehicle such as a van, trailer or the like, at least certain of the user controls are duplicated in an auxiliary remote control box that is detachable from the frame of the transporter and can be held at a safe distance away from the transporter via an umbilical control cord. The remote control unit includes forward/reverse, and run controls so that the transporter can be effectively backed or driven into or off of a ramp or similar vehicle loading/unloading structure.

For economy of construction, reliability, and ease of repair, the axles for each of the wheels and the drive mechanism are provided by a motor casing transmission gear and drive assembly at each wheel in which these assemblies not only provide the drive power to the wheel but also serve as the connective structural support for the wheel axle with respect to the transporter frame. The chain and sprocket drive from the output of the transmission gear box enables the wheels to have a relatively high ground clearance without undercarriage obstructions that would limit the maneuverability of the transporter over high ground obstructions.

BRIEF DESCRIPTION OF THE DRAWINGS

The foregoing and other features of the present invention will be more fully appreciated when considered in light of the following specification and drawings in which:

FIG. 15 is a perspective view showing the attachment of the belts to the cylindrical beams of the differential mechanism of FIG. 14.

DETAILED DESCRIPTION OF THE PREFERRED EMBODIMENT

DESCRIPTION OF EMBODIMENTS

Figure 1:
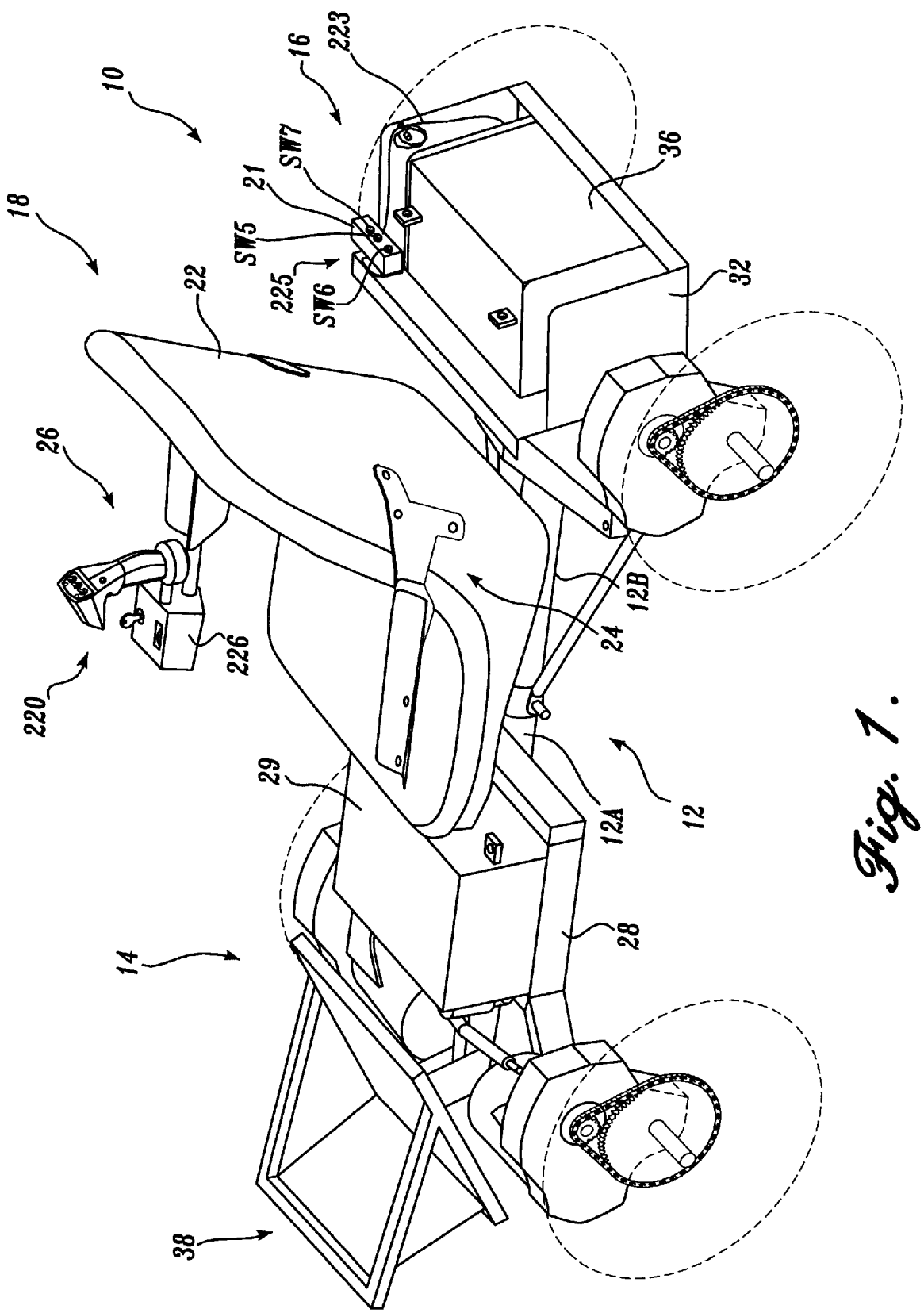
FIG. 1 is an isometric view of the personal transporter in accordance with the preferred embodiment of the invention as viewed from a rear side and slightly elevated position.
Figure 2:
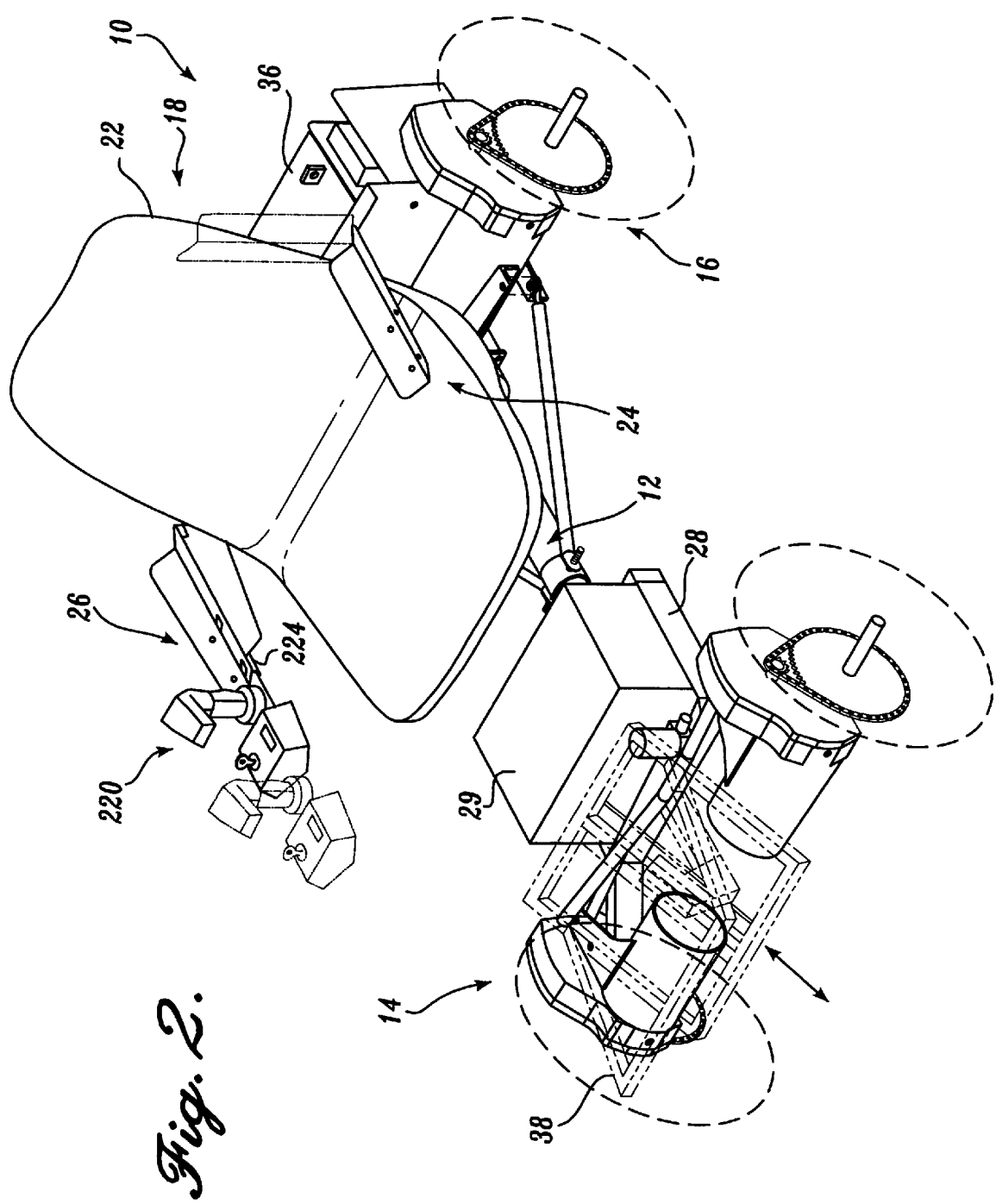
FIG. 2 is another isometric diagram of the transporter viewed from a front side and elevated stance, and showing positioning adjustments of the flight stick control and foot rest by phantom lines.
Figure 3:
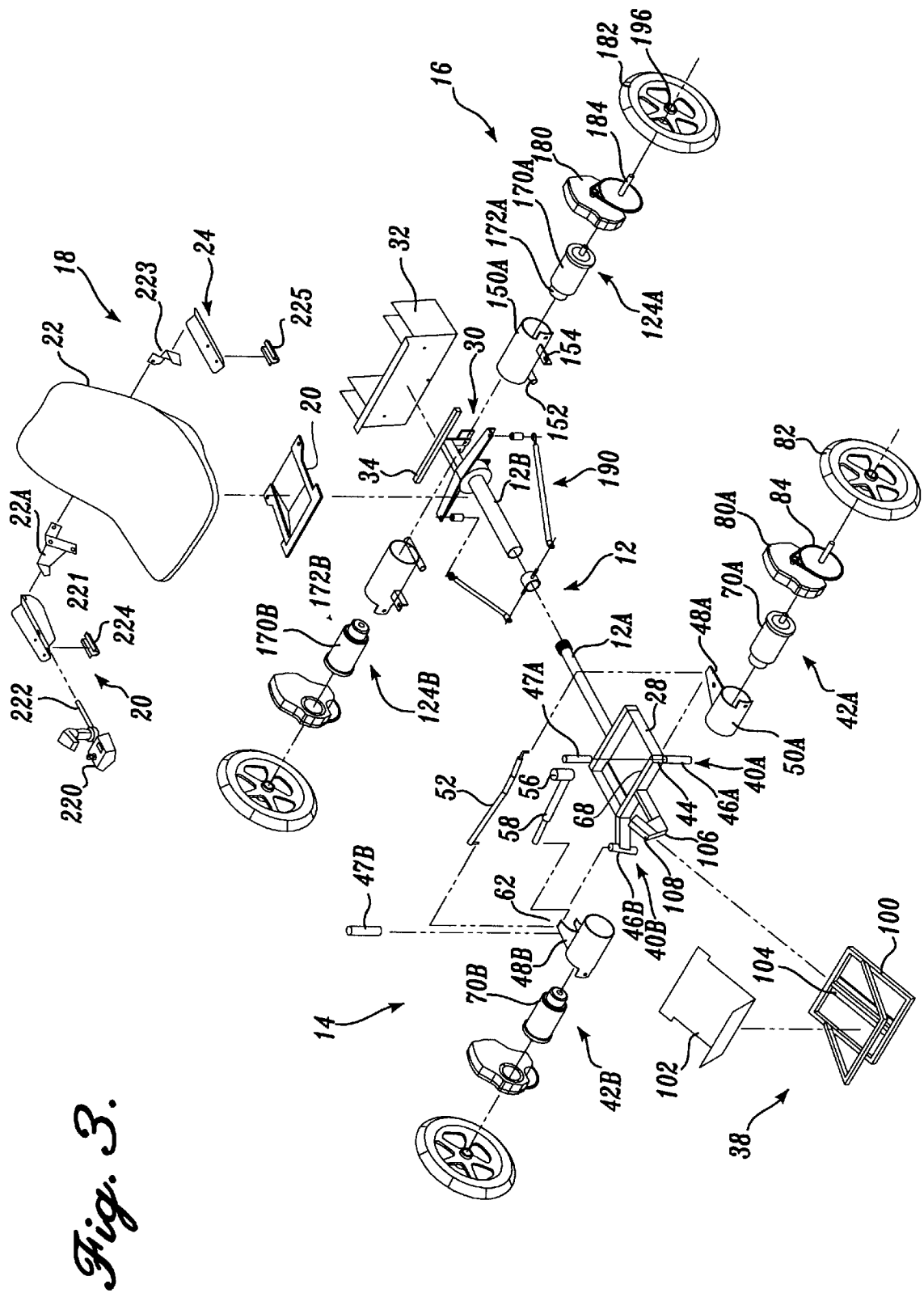
FIG. 3 is an exploded view of the principal components of the personal transporter of FIGS. 1 and 2.

With reference to FIGS. 1 and 2, the invention is embodied in a personal transporter 10 for on and off-road use and having multiple wheels independently driven by battery powered electric motors and configured with a light weight skeletal frame featuring a fore-aft beam 12, preferably of cylindrical and/or tubular cross section. The front axle, motor drive and wheel assembly 14 is joined to the rear axle, motor drive and wheel assembly 16 by beam 12 which in turn is made up of front and rear sections 12a and 12b in which the rear section 12b is tubular and is telescoped over the outer diameter of the front beam section 12a which may be either tubular or solid cylindrical. The telescoped arrangement of beam sections 12a and 12b provide a coaxial relative rotation between the front and rear assemblies 14 and 16 which are welded or otherwise securely joined to the respective rear and front extents of these telescoped beam sections. Mounted in overlying relation and transversely centered to beam 12 is a seat assembly 18 including a seat support plate 20 which, as indicated in FIG. 3 is attached such as by welding to the rear tubular beam section 12b. Attached to plate 20 is a bucket seat 22 to which left and right arm rest assemblies 24 and 26 are mounted. As described more fully below, the operator controls for the transporter are in turn mounted on arm rest 26 or arm rest 24 and are provided by convenient, easy-to-use flight stick steering, speed, and other controls. An auxiliary remote control 21 duplicates certain of the flight stick controls and is used in loading/unloading and stowing of the transporter as described hereinafter.

With further reference to the overviews of FIGS. 1, 2 and 3, a frame 28 of the front axle, motor drive and wheel assembly 14 includes a built in rectangular battery tray for holding a forward battery 29 positioned with the center of gravity over the fore-aft axis of beam 12 and slightly aft of the front wheel axles for stability and front wheel traction. Similarly, rear axle motor and wheel assembly 16 includes a motor mount bracket 30 to which a rear battery tray 32 is mounted by means of a crosswise tray support bar 34 welded to motor mount 30. A rear battery 36 is thus carried in tray 32 centered over the longitudinal axis of the transporter and behind the rear wheel axles for further stability by distributing the battery weight and providing weight-traction on the rear wheels. When the user is occupying seat 22, his or her feet are placed in a foot rest 38 which, as detailed below, is adjusted by sliding it along a pitched adjustment track to accommodate the needed length for individual users.

Figure 4:
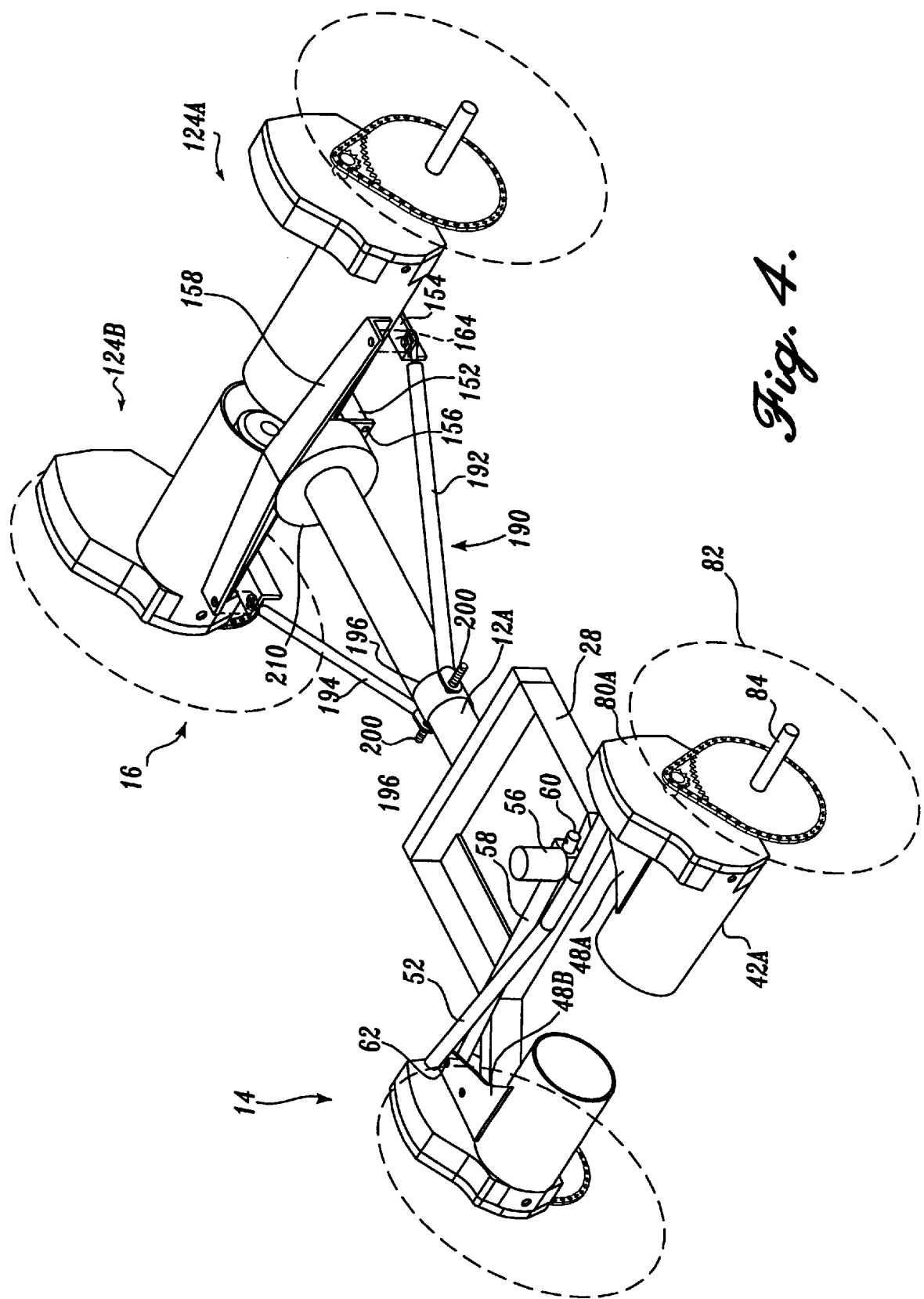
FIG. 4 is a subassembly view of the transporter frame and front and rear axle, wheel and drive subassemblies.

With reference to FIGS. 3 and 4, the front axle, motor drive and wheel assembly 14 will now be described, and is shown to include the steering mechanism and the structure of the adjustable foot rest. Frame 28 of assembly 14 has a pair of outboard motor mounts 40a and 40b for mounting the right and left front motor and gear subassemblies 42a and 42b, respectively. Both mounts are essentially the same, and thus with respect to the left hand mount 40a, it includes an outwardly and forwardly projecting frame extension 44 that is welded to frame 28 at the forward outboard corners and extends in the same horizontal plane as frame 28. At the end of frame extension 44, a vertical mounting tube 46 is welded to frame extension 44 and is made with a vertical dimension that fits just inside of a pair of vertically spaced apart horizontally projecting flanges 48a on motor housing 50a of motor and gear subassembly 42a. Bolts or pin fasteners 47a are used to hold the housing 50a and the rest of subassembly 42a captive in a horizontal plane level with frame 28 and accommodate pivoting of the subassembly about the axis of tubular motor mount 46a for steering purposes.

A steering tie rod 52 has at its opposite ends downwardly projecting pins for engaging holes on the upper flanges 48a and 48b of motor housings 50a and 50b. Thus both subassemblies 42a and 42b are permitted to rotate or pivot together in the horizontal plane while supporting the weight of the vehicle and its operator by means of the captive flanges 48a and 48b of housings 50a and 50b held by pins 47a and 47b in tubular mount 46a and 46b.

Power for steering is provided by motor 56 powered in an operator selected direction to force steering crank arm 58, including an ACME screw-follower mechanism operated by motor 56, laterally outwardly, or pull it laterally inwardly, relative to a steering motor mount 60 on frame 28. The outboard end of crank arm 58 is pivotally joined at a location offset from the pivot axis by a pinned connection 62 (see FIG. 4) to one of the flanges 48b of the right hand motor housing of subassembly 42b as illustrated. By driving steering crank arm 58 outwardly or pulling it inwardly under the operator control motor 56, a rotational moment is applied to flanges 48b about the pivot axis defined by tubular motor mount 46b and thence through tie rod 52 and equal moment is applied to flanges 48a of housing 50a.

Each of motor gear subassemblies 42a and 42b are the same except for the left and right hand configuration and, as shown by comparing FIGS. 3 and 4, the housing 50a receives the outer circumferential diameter of the cylindrical front wheel drive motor 70a. The transmission gear box 80a and associated sprocket driven wheel axle 84 are all joined securely together to housing 50a as shown in FIG. 4. The wheel 82 that is depicted in FIG. 3 and represented by dotted phantom lines in FIG. 4 is mounted on the sprocket driven wheel axle 84 that is journaled for rotation in the transmission gear box 80a as will be described in greater detail in connection with FIG. 10. Thus wheel 82 and its other front wheel counterpart on the right hand side of the transporter are mounted on driven axles 84 that in turn are supported by the housing motor and gear assemblies 42a and 42b all of which are held captive as a unit by the connection of vertically spaced motor housing flanges 48b and 48b to the tubular motor mounts 46a and 46b as described. The user control of steering motor 56 will be explained below in connection with FIGS. 11, 12, 13a and 13b.

Foot rest 38, as best shown in FIGS. 1 and 3, has a frame 100 shaped to support a foot rest panel 102 bent at right angles and attached to frame 100 by welding or other suitable means. Frame 100 has a centrally disposed inverted channel member 104 that forms in part reinforcement and an attachment point for one leg of bent panel 102 and, more importantly, serves as a track to slidably engage a prow subassembly 106 that projects from the forward horizontal member of frame 28 and has an upwardly projecting and forwardly and downwardly sloping key 108 that engages the inverted channel 104 of frame 100 and allows adjustable upward and downward and fore and aft slidable positioning of the foot rest 38 on prow assembly 106. Detents or other setting means are provided such as in the form of screw holes or the like to secure foot rest 38 once adjusted.

Figure 7:
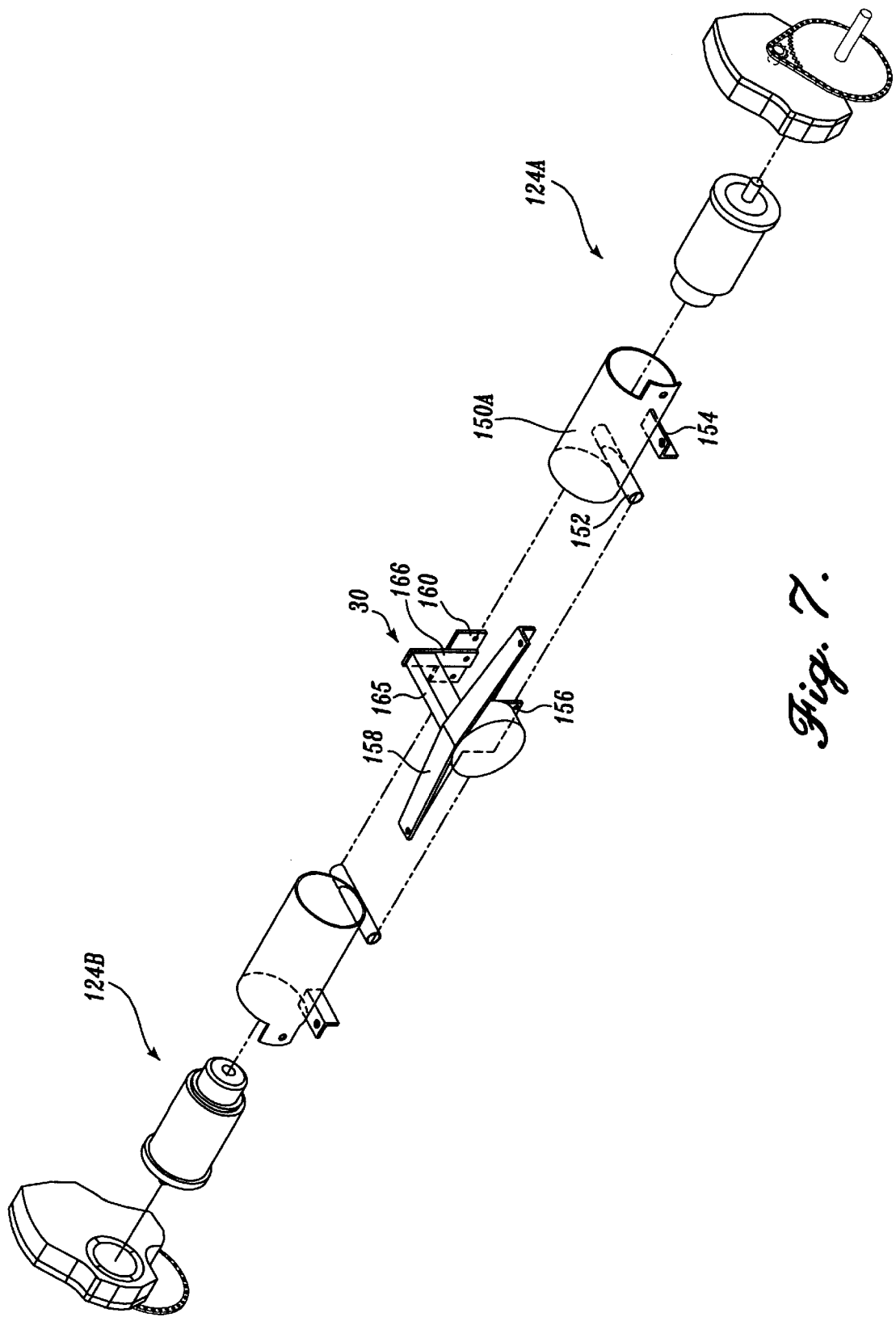
FIG. 7 is an exploded view of the rear wheel subassembly and electrical motor and gear-sprocket drives and their mounting to the rear axle assembly.
Figure 8:
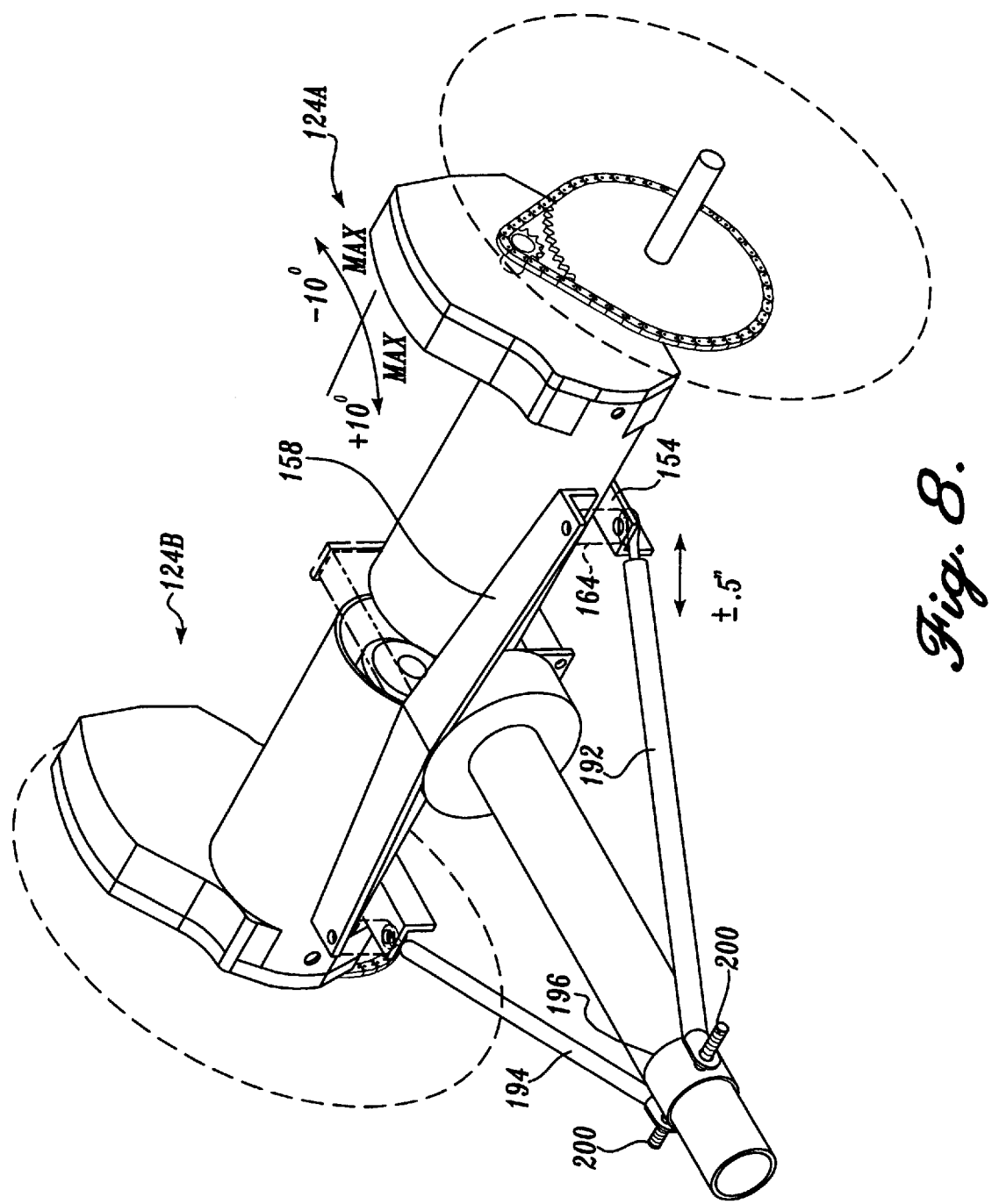
FIG. 8 is an isometric view of the rear axle, drive and wheel subassembly joined to the tubular center beam that constitutes the principal frame member of the transporter.
Figure 9:
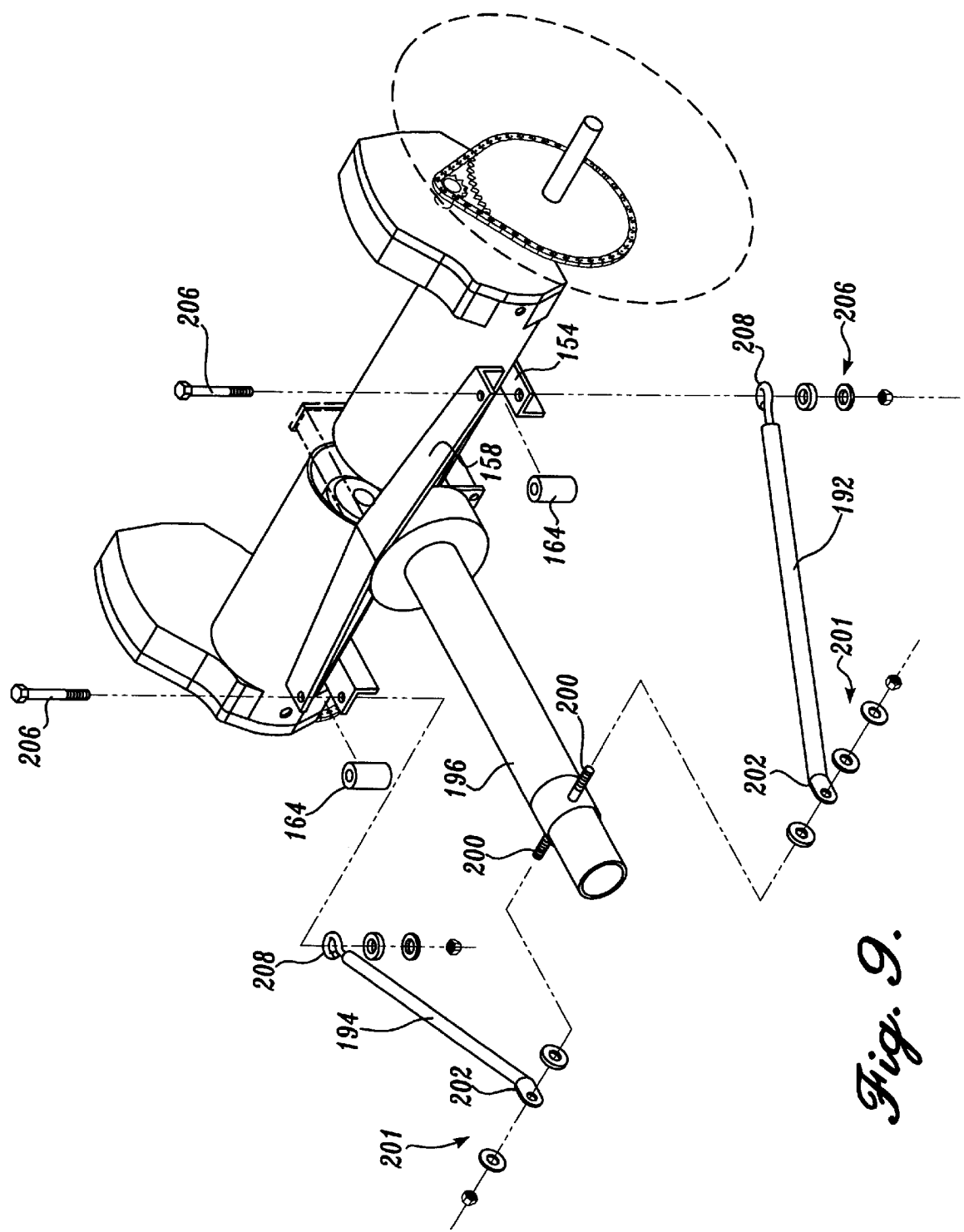
FIG. 9 is an exploded view of the adjustable struts that assist in supporting and aligning the rear motor drives and wheels on the rear axle.

Now with reference to FIGS. 2–4 and 7–9, rear axle, motor drive and wheel assembly 16 is shown partly in FIG. 2 and more completely in FIGS. 3 and 4 to include a motor and transmission gear box subassembly 124a on the right side of the transporter and an identical but oppositely oriented subassembly 124b on the left hand side of the transporter. As shown for subassembly 124a, each includes a cylindrical sleeve housing 150a, a motor 170a, and in this instance, the rear drive motors 170 are accompanied by an attached brake unit 172 that acts on the tail of the motor shaft, and a transmission gear box 180 fitted with a journaled wheel axle 184 driven by a chain and sprocket wheel 182 from a geared down output sprocket on transmission gear box 180. When housing 150a, motor and brake 170a and 172a, respectively, and transmission gear box 180 are joined together, the resulting subassembly 124a functions as a structural unit that is mounted by means of tubular and angle flange attachment members 152 and 154, respectively, of housing 150a that are received by mating attachment points on rear motor mount bracket 30 carried by the end of tubular beam section 12b. As best illustrated in FIGS. 4 and 7, subassemblies 124a and 124b have tubular mounting members 152 held between a lower apertured flange 156 that is a fixed part in this embodiment of a crosswise mounted axle support member 158, and another flange 160 also in a vertical plane and spaced rearwardly of the forward mounting flange 156 by a distance just slightly greater than the length of the tubular mounts 152. After the housing 150a of subassembly 124a is positioned with tubular support 152 in registration between the apertures of flanges 156 and 160, a pin or bolt secures the housing. L-shaped attachment flanges 154 projecting from housing 150a are disposed somewhat outboard of tubular attachments 152 and at a somewhat higher elevation relative to the axis of subassembly 124a positioning an aperture on a horizontal leg of L-shaped flange 154 in vertical registration with an apertured end of crosswise support member 158. An elastomeric shock absorbing bushing 164 is positioned as shown in FIGS. 4, 8 and 9 to absorb some vibration and shock in the vertical dimension between flange 154 and crosswise support member 158. A vertical pin or bolt secures the assembly to the aft ends of struts that form a rear end alignment adjustment stabilizer assembly 190 (FIG. 4). Rear mount bracket 30, which includes vertical flange 160, is formed by a rearwardly extending beam structure 165 (FIG. 7) welded to the back face of crosswise support member 158 at a position in this embodiment slightly overlying the axis of and rearwardly of the beam 12. The rear most end of structural member 165 in turn serves as the attachment point by welding or other suitable fastening of flange 160 by means of an intervening vertical support member 166, although it is apparent that numerous other configurations may be used for this purpose to provide the apertured flanges for accommodating the motor housing tubular supports. When arranged and secured together in this manner, each of the rear wheels, such as illustrated by wheel 182, are slipped onto rear axle 184 which in turn is supportively journaled in transmission gear box 180 and fastened through the motor and motor housing to the tubular and flange supporting structures 152 and 154 as described above. The subassembly 124b on the right hand side of the transporter is similarly assembled and mounted.

To provide further structured support of the rear axle assembly and crosswise support member 158, and to resist shifting or twisting in the horizontal plane and to provide for rear wheel alignment, the stabilizer assembly 190 includes a pair of rearwardly and outwardly extending adjustable struts 192 and 194. The forward ends of struts 192 and 194 are secured to transversely and horizontally projecting studs 200 from a midbeam collar 196 that is shouldered against the forward end of the rear tubular beam section 12b as best shown in FIGS. 4, 7 and 8. In this embodiment, threaded studs 200 are used with nut and washer assembly fasteners 201 as shown in FIG. 9 to retain flattened vertical flanged ends 202 of struts 192 and 194. The rear ends of these struts 192 and 194 are held captive by vertical bolts and associated washer and nut assemblies 206 that pass through eye bolts 208 adjustably threaded into internally threaded end openings of struts 192 and 194 as best shown in FIG. 9. By threadably changing the lengthwise position of the eyes of eye bolts 208 relative to the fixed length of struts 192 and 194, rear wheel alignment is achieved in a ±10 degree adjustment arc as shown in FIG. 8. In effect, by complementary lengthening and shortening of struts 192 and 194 by means of eye bolts 208 prior to attachment of the eye bolts to bolt assemblies 206 and flanges 154 and crosswise support member 158, a sufficient amount of play between motor mount bracket 30 and subassembly 124 causes the rear wheel axles to be forced into a tracking position with respect to the front wheels.

Figure 5:
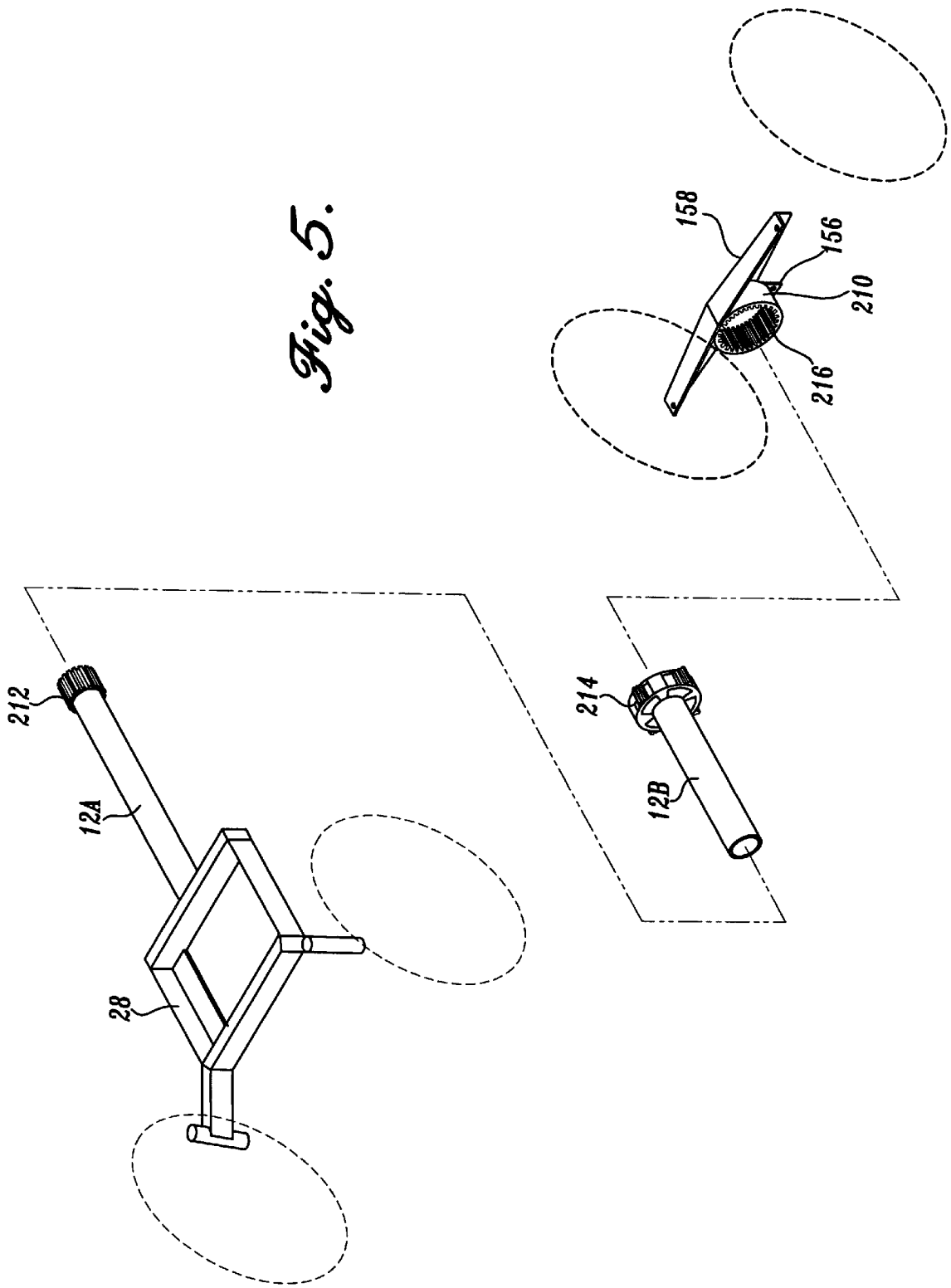
FIG. 5 is an exploded view of the main elements that provide a differential seat support mechanism for causing the transporter seat to pivot from side to side at a reduced rate of the differential rotation of the front and rear wheel assemblies when moving over uneven ground.

As mentioned above, the coaxial construction of the central fore-aft beam 12 of the transporter allows the front and rear wheel axles to tilt relative to each other and hence crosswise of the beam 12 as the transport navigates uneven ground. To avoid excessive tilting or rotation of the seat assembly 18 that would result by fastening it either to the rear axle assembly such as to crosswise support member 158 or to the front wheel assembly such as by attaching the seat to frame 28, a differential mechanism is incorporated into the relative rotation of beam sections 12a and 12b to reduce the amplitude of the tilting or rotation of the user's seat to a rate intermediate the overall differential roll or tilt between the front and rear wheel assemblies. This is shown more particularly in reference to FIGS. 4, 5 and 6. Thus in FIG. 4, a differential gear assembly is mounted in an annular housing 210 which, as shown in FIG. 5, is implemented in this particular embodiment by a planetary gear assembly including a sun gear 212 mounted coaxially on the end of the front beam section 12a, a planetary gear assembly 214 is mounted again coaxially to a rear end of tubular beam section 12b and the sun gear 212 and planetary gear assemblies 214 are received in lengthwise registration all coaxially within a cylindrical part of differential gear housing 210 that is welded to or integral with the crosswise support member 158 and vertical motor mounting flange 156. When all assembled and secured, as shown in FIG. 4, the tubular beam section 12b rotates under the gearing of sun gear 212, planet gear assembly 214, and the internal geared cylinder wall 216 of housing 210 to rotate section 12b at a reduced rate intermediate the differential rotation.

Figure 6:
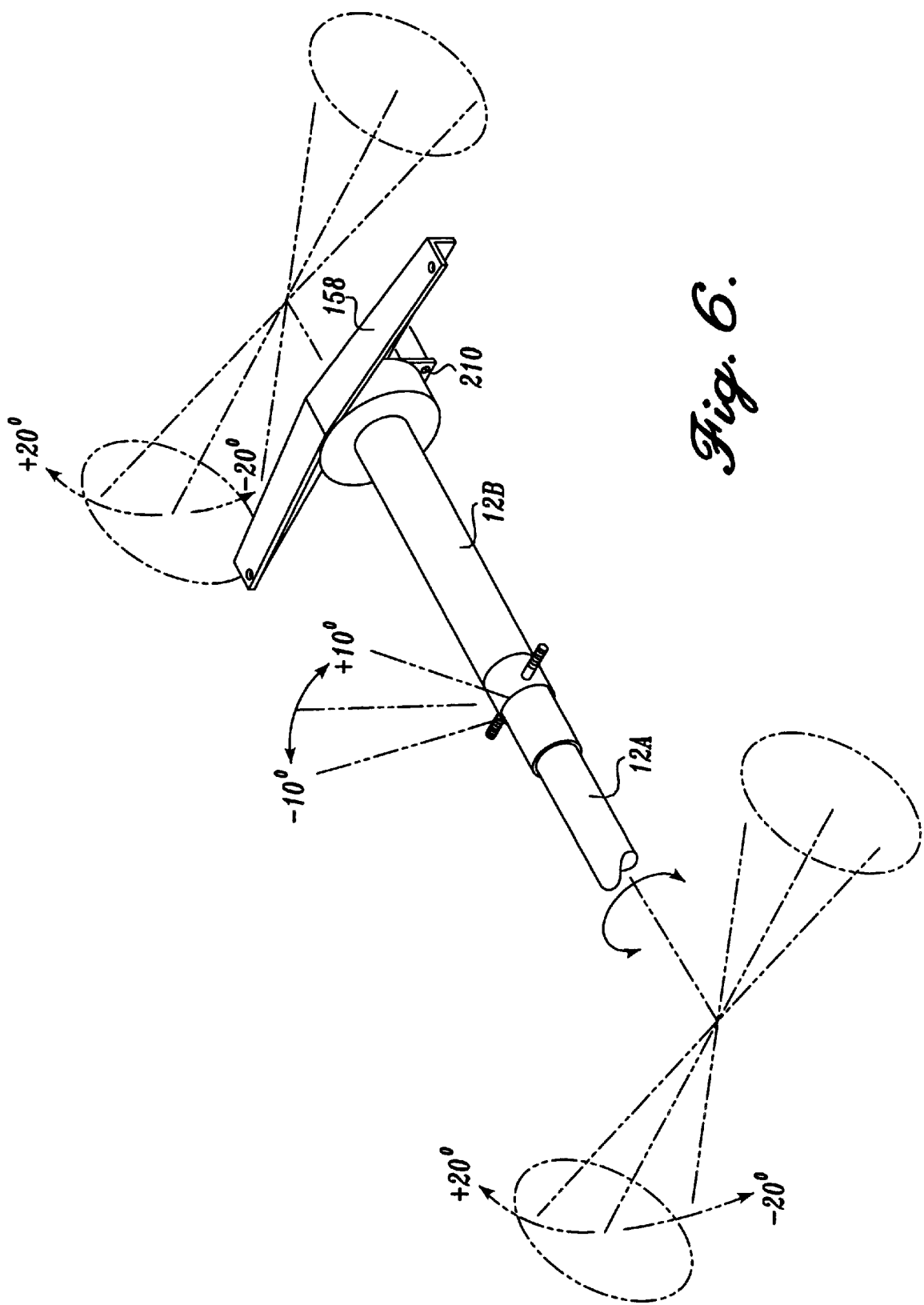
FIG. 6 is a diagrammatic view incorporating fragments of the differential seat support mechanism to illustrate the reduced rotation or pivot of the seat compared to the rotation of the front and rear wheel axle assemblies about the central frame axis.

The seat assembly 18, including seat support plate 20 is affixed as indicated in FIG. 3 to tubular section 12b. Thus, as shown in FIG. 6, for example, should the front wheel axle tilt relative to the center beam by ±20 degrees to the horizontal plane, the differential mechanism limits the rotational rate of beam section 12b to which the seat assembly is secured to ±10 degrees, or half the rate of the front wheel tilt. Furthermore, when the front and rear wheel assemblies tilt in opposite directions, the differential mechanism maintains the seat level, or in effect cancels out the amount of equal and opposite rotation between the front and rear wheel assemblies to create a more comfortable, safe ride for the user. Although a differential gearing assembly of the planetary type is used in this main embodiment, alternatives exist such as described hereinafter in connection with FIG. 14 to provide the seat tilt differential using an assembly of belts, cylindrical beams and interface locked bushing blocks.

Figure 10:
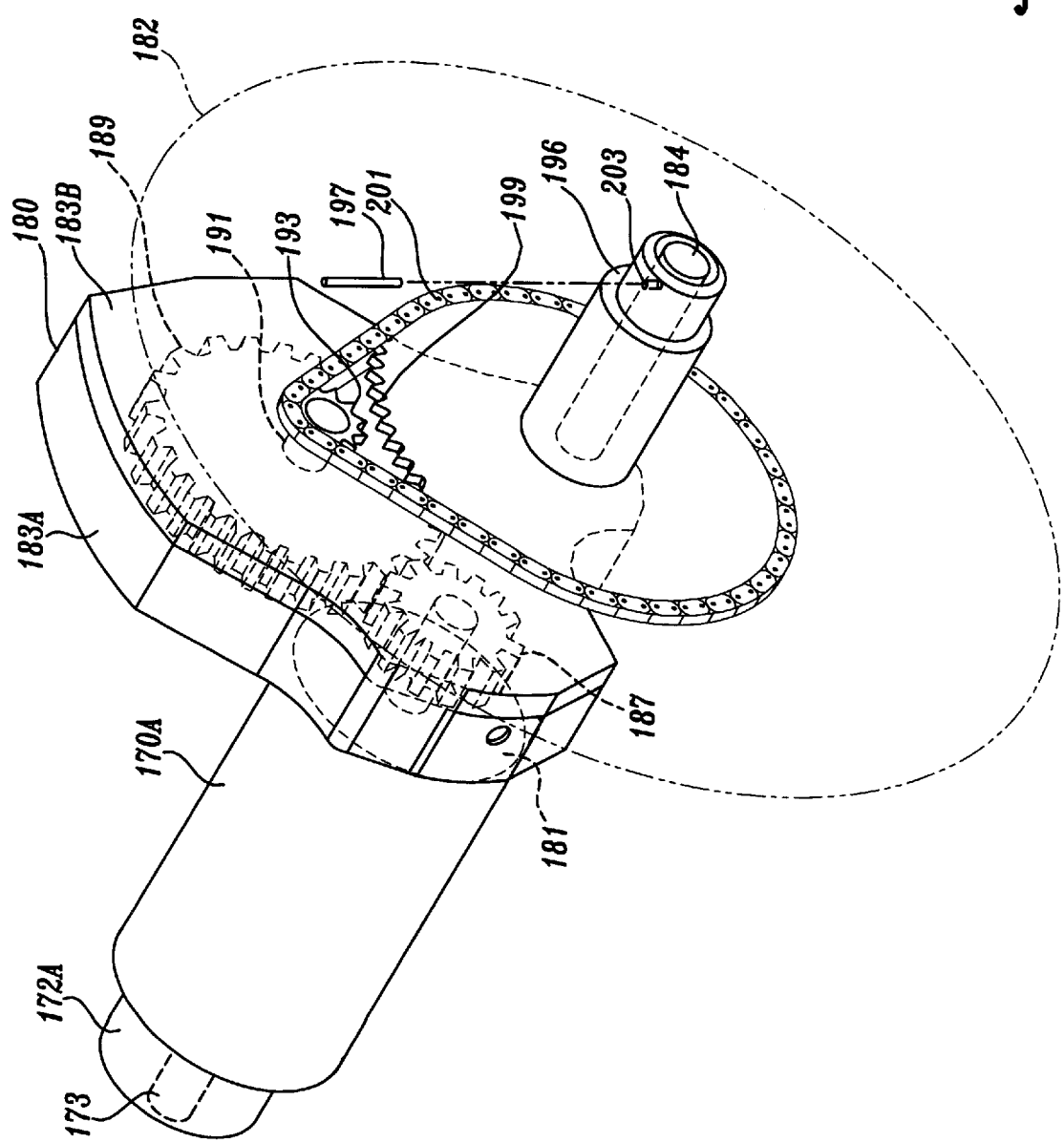
FIG. 10 is an enlarged isometric view of one motor drive assembly with the associated wheel shown in phantom.
Figure 11:
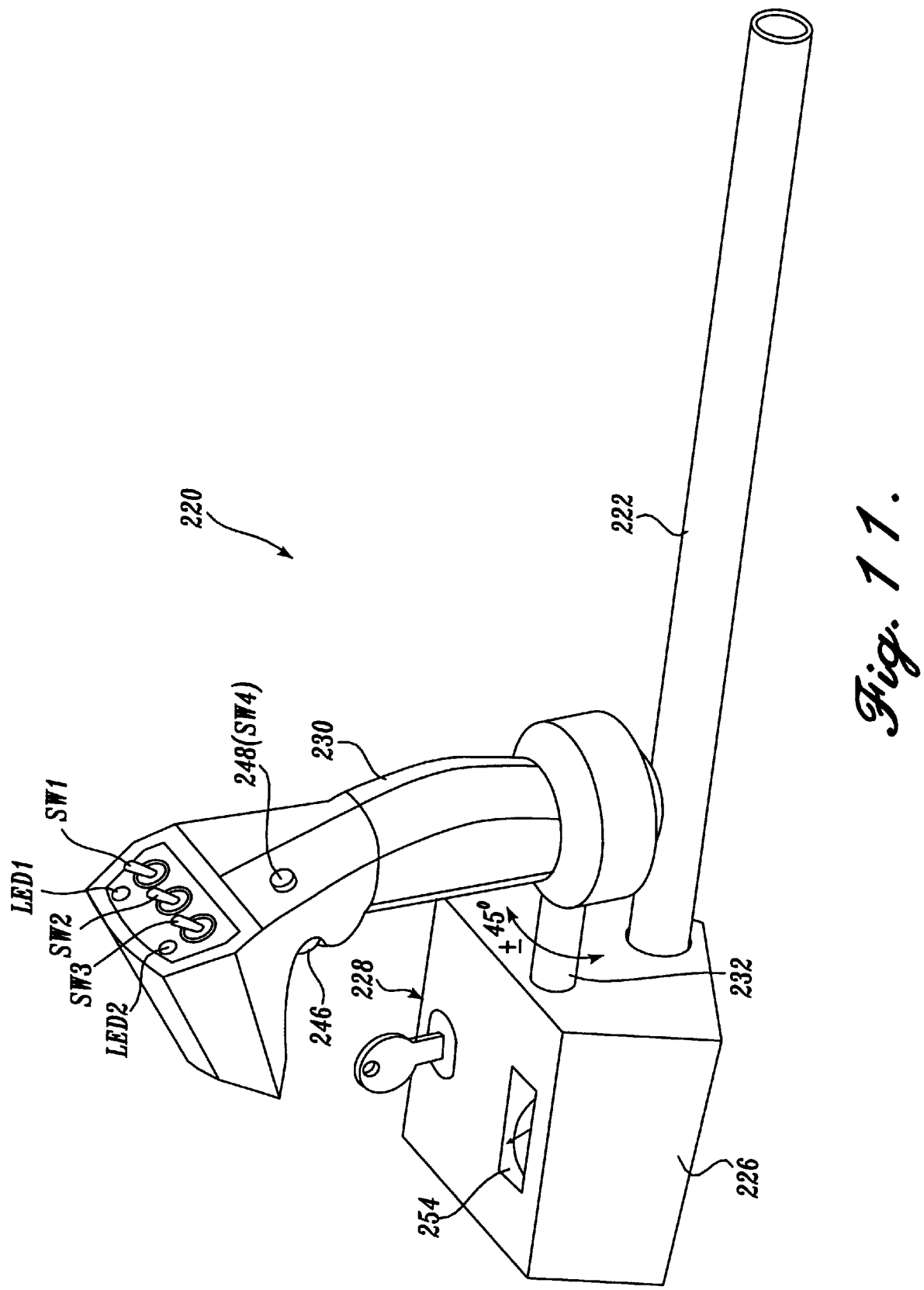
FIG. 11 is an enlarged isometric of the flight stick type control that mounts to one arm rest.

With reference to FIG. 10, and by way of example, each of the subassemblies of the electrical motor, transmission gear box and sprocket drive will be described by reference to the left rear motor 170a and associated transmission gear box 180 that supports the left rear wheel axle 184 as illustrated. The rear wheel drive motors 170a have mated brakes 172a at the inboard ends of the motor as illustrated; the front motors in this embodiment are not equipped with brakes. Brake 172a is of conventional design operating on the tail shaft indicated by the phantom lines 173, and motor 170a and complementary brake 172a are commercially available as a unit from such manufacturers as Dumore Corporation of Cincinnati, Ohio, and Inertia Dynamics of Los Angeles, Calif., respectively. The outboard end of motor 170a is fastened by bolts (not shown) to an opening 181 on an inside wall of a two-part gear box housing 183a and 183b. Motor 170a and housing sections 183a and 183b together with the motor casing 150a (see FIG. 3) are configured and fastened together to form a structural unit that supports the entire subassembly including the transmission gear box 180 and an axle 184 journaled in and projecting from an outboard face of gear box section 183b for supportively mounting wheel 182. Thus wheel loads are born by axle 184 through the transmission housing sections 183a and 183b of transmission gear box 180 and thence through motor casing 150a and motor 170a back to attachment flange 154 and tubular support 152 that are supported by the crosswise support member 158 and the rearwardly attached motor mount bracket 30 all carried at the end of the transporter beam 12.

Transmission gear box 180 includes reduction gears indicated in phantom lines at 187 and 189 with the smaller gear 187 driven by the output shaft of motor 170 and the larger reduce speed gear 189 driving an output shaft 191 that carries sprocket 193.

Wheel 182 is formed as a structural unit with a hub 196 rigidly secured to the wheel rim (see FIG. 3) so that a shear pin 197 secures hub 196 to stub axle 184 which in turn is rotatably journaled in transmission gear box 180 and driven in rotation by a larger sprocket 199 by chain 201 passing over the smaller sprocket 193. With wheel 182, including the structurally affixed hub 196, placed on the rotatably driven stub axle 184 and shear pin 197 in place in aligned pin openings indicated at 203, the wheel is forced to rotate upon energization of motor 170 and can be braked by the operation of tail shaft brake 172 which brakes the motor and hence the transmission path to the driven stub axle 184.

To energize and control transporter 10, a flight stick 220 is mounted on the arm rest 26 (see FIG.1) by means of a rotatable and slidably extendible tubular support 222 that is received within an arm rest sleeve 224 (see FIG. 3), or in the left arm rest by a sleeve 225. Associated with the flight stick control 220 is an ignition box 226 that contains certain electronic and electrical controls that will be described in connection with FIGS. 11, 12, 13a and 13b below, and supports on the top panel a key operated ignition switch 228 for turning power on to the transporter controls. Ignition box 226 provides an interim mechanical support for the control stick 230 that is grasped by the operator's right hand in this instance and pivoted left or right by about 45 degrees from perpendicular to rotate a steering control shaft 232 with respect to ignition box 226. Inside ignition box 226 are the electronic steering control switches and a steering speed potentiometer that respond to rotation of shaft 232 to effect, the necessary drive signals to the steering motor 56 to effect movement of the wheels for left or right direction. A shaft 222 adjustably slides lengthwise in the sleeve 224 of arm rest 26 for comfortable positioning of control stick 230.

At the upper end of control stick 230 are a series of toggle switches including a high/low power select switch SW3, a forward/reverse select switch SW2, and a two wheel/all wheel (in this instance, four wheel) drive select switch SW1. Throttle or speed is controlled by a variable potentiometer responsive to a spring-biased depressable trigger 246 operated by the user's index finger. Also provided are horn button 248 and indicator lights LED1 and LED2, respectively, two wheel/four wheel modes and showing high/low power. A battery level meter 254 may be provided on ignition box 226 as indicated.

Both arm rest assemblies 24 and 26 are mounted on seat 22 by brackets 221 and 223 (see FIG. 3) that have pivot attachments for the arm rests allowing them to be swung up and out of the way for easy seating and unseating as shown by the dotted line moved position of arm rest assembly 24 in FIG. 2.

Figure 12:
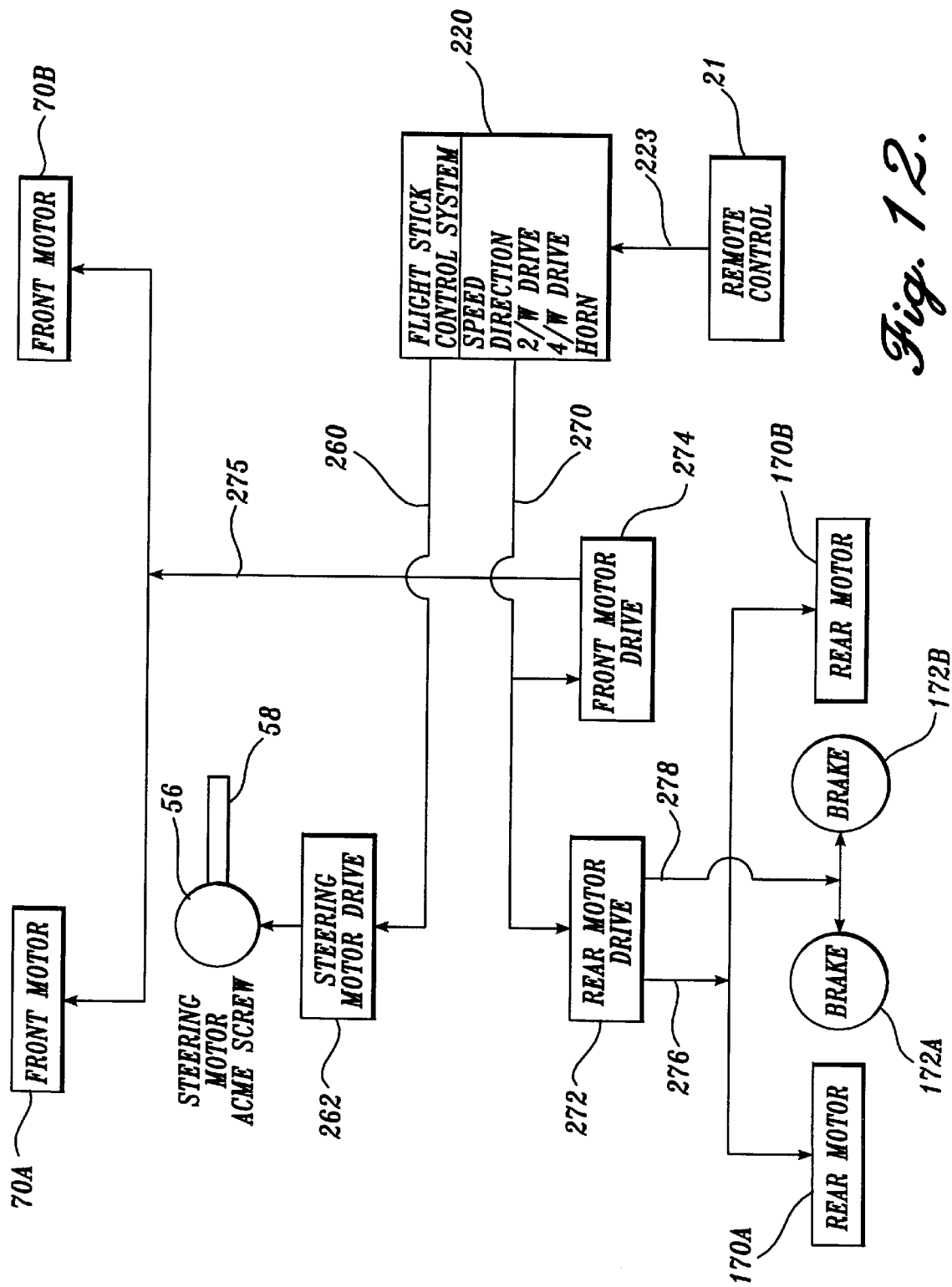
FIG. 12 is a generalized block diagram of the electric power and control system of the transporter.

In FIG. 12, the electrical power and electronic controls are illustrated in which flight stick 220 is shown to contain the speed direction two wheel/four wheel selection and horn. An output 260 from flight stick 220 goes to the steering motor drive 262 which in turn selectively powers the steering motor and an ACME screw motion device 56 and 58, respectively, corresponding to these components in FIGS. 3 and 4. Power and control for the front motors is developed by flight stick lead 270 sending commands to a front motor drive control 274 from Curtis PMC Company, San Jose, Calif., that in turn delivers pulse width modulated power in parallel to front wheel drive motor 70a and 70b over lead 275. Similarly, controls over 270 from the flight stick 220 are fed to a rear motor drive control 272 from Curtis PMC Company, San Jose, Calif., that develops rear motor pulse width modulated power on lead 276 and brake control signals on lead 278 that are respectively applied in parallel to the rear motors 170a and 170b and to the modular brakes 172a and 172b in parallel.

For loading and unloading transporter 10, an auxiliary control is provided in the form of a hand-held remote control 21 that is demountably attached to the transporter at a convenient location such as shown in FIG. 1 to rear battery tray 32 and joined by an umbilical cord 223 to the ignition control box 226. When used, hand-held remote control 21 is detached at 225 (FIG. 1) from the transporter and with the operator standing to the side of vehicle, power and forward or reverse run commands are remotely given to cause the transporter 10 to back or drive onto or from a vehicle or trailer loading ramp or the like. More particularly, remote control 21 includes a momentary contact power switch SW6 that is actuated to supply power to the remote control unit, and a run switch SW5 that is also of a momentary contact type that is pressed concurrently with the power switch SW6 to cause a relatively low speed command signal to be applied to the motor drive speed control units (described more fully below in connection with FIGS. 13a and 13b). Additionally, a forward/reverse control switch SW7 on the remote control 21 selects forward or reverse movement of the transporter as needed. After unloading or loading transporter 10, the user then stows umbilical cord 223 and mounts control unit 21 as indicated in FIG. 1 on battery tray 32.

Figure 13A:
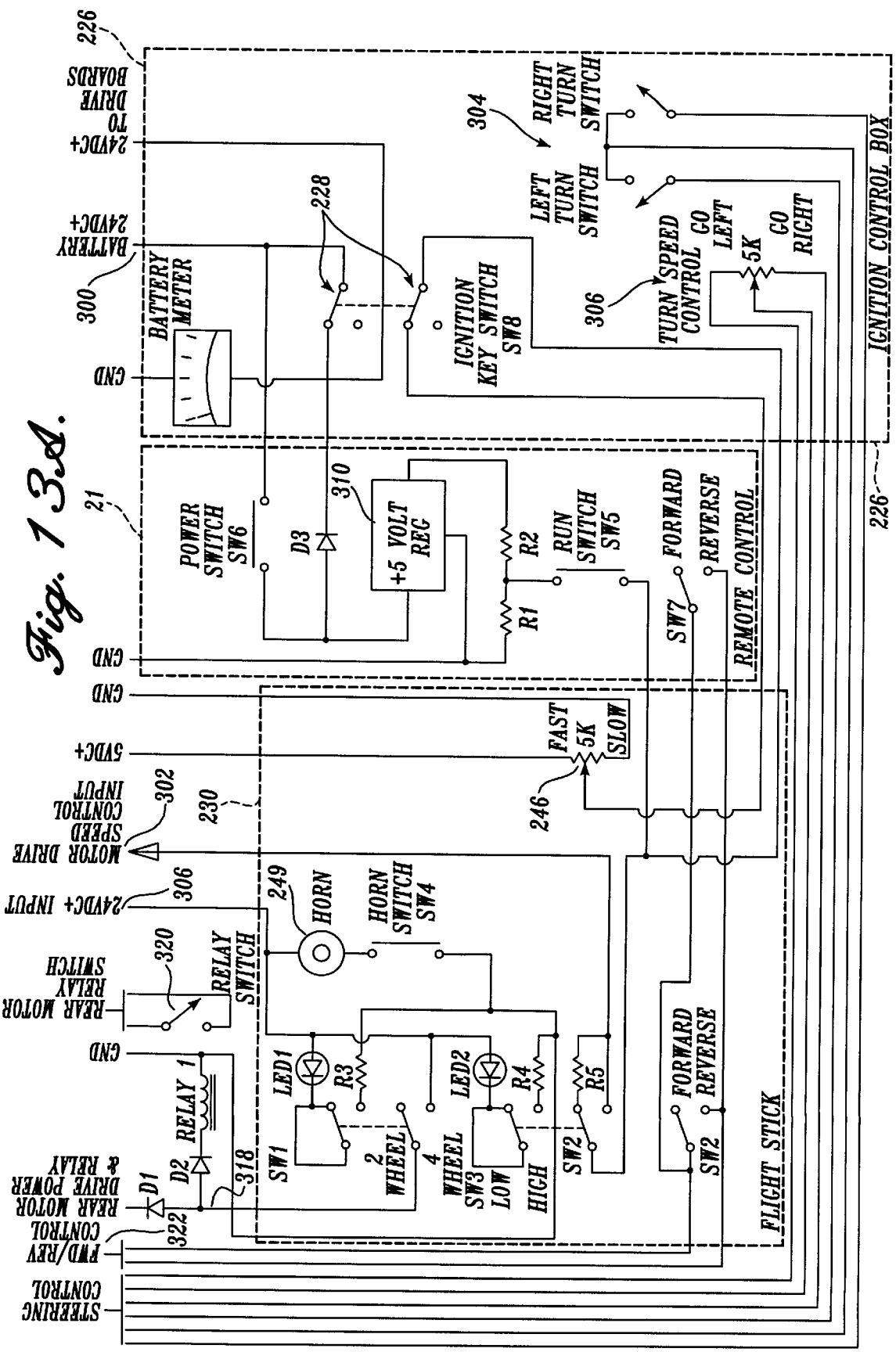
FIGS. 13a and 13b are schematic diagrams of circuits used in the electric power and control system of FIG. 12.

With reference to FIG. 13a, a schematic diagram is indicated for the various power and control leads that are a part of flight stick control 220, including control stick 230 and ignition control box 226, as well as remote control 21. With reference to the components and circuits bounded by dotted line ignition control box 226 in FIG. 13a, battery power is supplied over lead 300 to remote control 21 and through contacts of key operated ignition switch 228 to the DC drive boards of the DC motors at each driven wheel assembly. Additionally, another set of contacts on ignition switch 228 closes a circuit from speed or throttle potentiometer 246 and contacts of switch SW3 either through a speed reducing resister R5 or directly to a motor drive speed control input 302 that is a lead that comes from the flight stick controls 230 as shown. Left and right turn switches 304 are selectively closed depending on the steering tilt control that is effected by rotating control stick 230 (see FIG. 11) clockwise and counterclockwise +45° as indicated to effect steering commands that pass from the ignition control box 226 to the steering controls shown in FIG. 13b. Working with left turn and right turn switches 304 is a direction control potentiometer 306 that determines turning speed and includes a set of three leads that also pass from the ignition control box 226 and extend to the steering controls of FIG. 13b.

Remote control 21 in FIG. 13a has the above described run switch SW5 and power switch SW6 of the momentary contact type and a forward/reverse direction switch SW7. To provide a very slow, safe remote control speed, run switch S5 is connected to a voltage divider of resistors R1 and R2 that are in turn connected across a voltage regulator 310 that when energized by power switch SW6 delivers a regulated divided down voltage to run switch SW5 for sending a motor drive speed control command to lead 302 as described above. Diode D3 in remote control 21 blocks power to regulator 310 when SW6 is open.

The circuitry of flight stick 230 includes switch SW1 that selects four wheel or two wheel drive through the double poles; one pole switching in light indicator LED1 in series with R3 and the other pole switching a control signal from 24 volts on lead 306 to an output lead 318 for operating the rear motor drive 272 and to relay 1 to engage power to the rear wheel-drive motor. This is effected by operating relay 1, which in turn closes relay switch 320 to effect the energization of the rear drive motor. Diodes D1 and D2 provide protection against back flow of current from this circuit. The contacts of forward/reverse select switch SW2 are in parallel with the forward/reverse contacts SW7 of the remote control 21 and provide control leads at 322 to the front and rear motor drives 272 and 274 as shown in FIG. 12 for selecting the motor direction and hence direction of movement of the transporter 10.

The high and low power select switch contacts SW3 has a first pole for operating indicator light LED2 by switching it in circuit with a resistor R4 to illuminate the light when in the high power mode, and a second pole that switches in and out a resistor R5 for selectively decreasing or increasing the speed control signal to motor drive speed control input on lead 302 as shown. Horn switch SW4 is a momentary contact switch connecting DC battery power to horn 249.

Figure 13B:
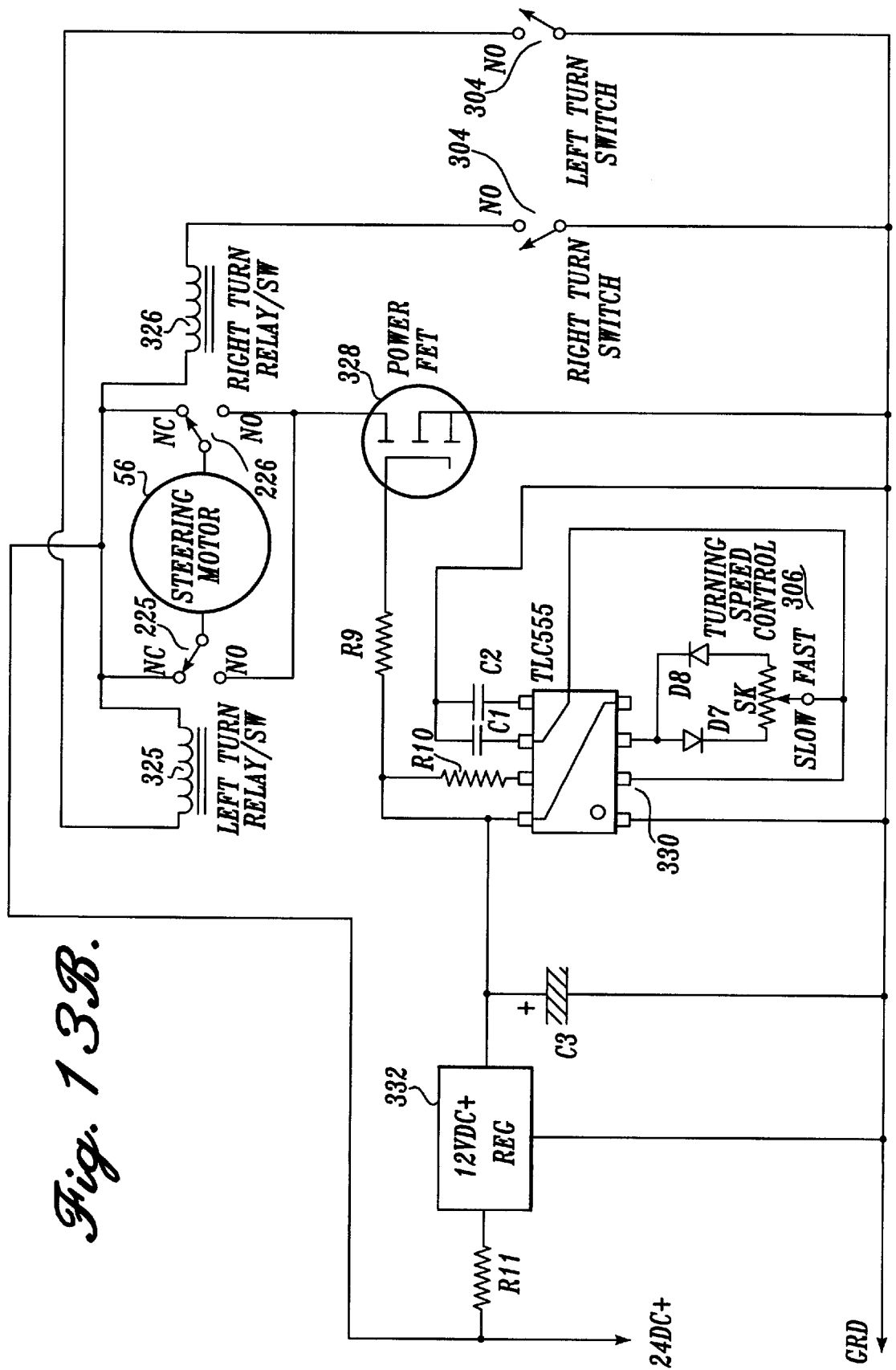

With reference to FIG. 13b, the steering control circuitry is illustrated to include left and right turn switches 304 that are operated by the user tilting flight stick 230 as described above to selectively actuate either left or right turn relays and associated relay contacts indicated at 325 and 326. The normally closed contacts of relay switches 225 and 226 de-energize the steering motor 56 (see FIG. 3), and when one of the direction switches causes its associated relay to be energized the contacts are driven to the normally open position applying power through power FET 328 to the steering motor 56 to effect right or left hand steering actuation of the ACME screw drive mechanism 58 that turns the front wheel assemblies. To control the power delivered to steering motor 56 through power FET 328, a commercial timing circuit known in the industry as TLC555 switches power FET to a low impedance state for controlled timing periods determined by the position of a turning speed control potentiometer 306 having the armature of the potentiometer connected to a timing input 330 of the TLC555 timer. Resistor R10 and capacitors C1 and C2 provide the RC timing constant for determining the operating conditions of the TLC555 timer. Diodes D7 and D8 determine the pulse width time of power delivered to power FET 328 which in turn determines the speed of steering motor 56. Filter capacitor C3 is connected across the output of a 12 volt regulator 332 and a voltage dropping resistor R11 drops the 24 volt source down to 12 volts as the circuit indicates. Resistors R9 and R10 deliver the control switching voltage to power FET 328 for operation by the TLC555 timer.

Figure 14:
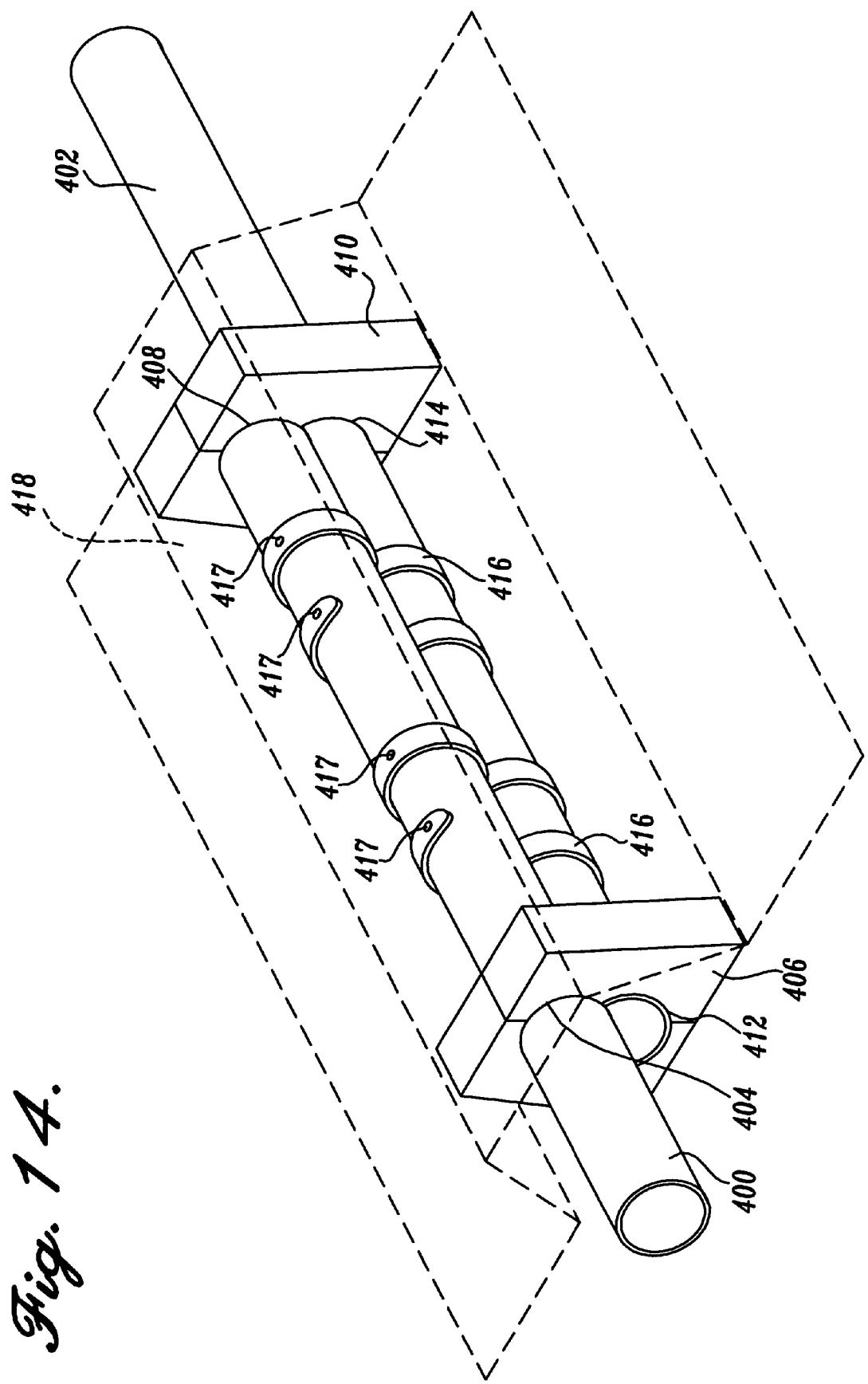
FIG. 14 is a diagrammatic view, similar to FIG. 6 above, showing an alternative differential mechanism for constraining seat, pivot or sway in response to rotation of the front and rear wheel axle assemblies.

Next referring to FIGS. 14 and 15, an alternative differential mechanism for constraining seat pivot or sway in response to rotation of front axle, motor drive and wheel assembly 14 and/or rear axle, motor drive and wheel assembly 16 is shown. The planetary gear assembly described above in FIG. 6 is replaced by front longitudinally extending cylindrical beam 400 and rear longitudinally extending cylindrical beam 402. Front longitudinally extending cylindrical beam 400 is connected to front axle, motor and wheel assembly 14, and rear longitudinally extending cylindrical beam 402 is connected to rear axle, motor and wheel assembly 16. Front longitudinally extending cylindrical beam 400 and rear longitudinally extending cylindrical beam 402 are oriented in parallel with front longitudinally extending cylindrical beam 400, preferably located over rear longitudinally extending cylindrical beam 402. Front longitudinally extending cylindrical beam 400 and rear longitudinally extending cylindrical beam 402 are disposed along the longitudinal axis of personal transporter 10. Front longitudinally extending cylindrical beam 400 is rotatably secured in top opening 404 of front bushing 406 and top opening 408 of rear bushing 410. Rear longitudinally extending cylindrical beam 402 is rotatably secured in bottom opening 412 of front bushing 406 and bottom opening 414 of rear bushing 410. Front busing 406 and rear bushing 410 thus connect front longitudinally extending cylindrical beam 400 and rear longitudinally extending cylindrical beam 402 while allowing independent rotation thereof. Front longitudinally extending cylindrical beam 400 and rear longitudinally extending cylindrical beam 402 are spaced apart from front bushing 406 and rear bushing 410 at a distance slightly greater than the width of belts 416. Belts 416 are preferably comprised of a high tensile strength, low elastic synthetic polymer. However, belts 416 can also be comprised of alloy chain links or mesh. Belts 416 are attached to front longitudinally extending cylindrical beam 400 and rear longitudinally extending cylindrical beam 402 by a plurality of belt pins 417. Seat plate 418 is preferably an elongate frusto-pyramidal member on top of which seat 22 is attached. Seat plate 18 is located over, and connected to, each of front bushing 406 and rear bushing 410.

Belts 416 are attached to, and interwoven between, front longitudinally extending cylindrical beam 400 and rear longitudinally extending cylindrical beam 402 such that relative rotation between front axle, motor and wheel assembly 14 and rear axle, motor and wheel assembly 16 causes relative rotation between front longitudinally extending cylindrical beam 400 and rear longitudinally extending cylindrical beam 402 to rotate front bushing 406, rear bushing 410, seat plate 418 and seat 22 a lesser amount than the relative rotation between front axle, motor and wheel assembly 14 and rear axle, motor and wheel assembly 16. The amount of relative lesser rotation of front bushing 406, rear bushing 410, seat plate 418, and seat 22 is predicated on the structure of the interconnection of front longitudinally extending cylindrical beam 400 and rear longitudinally extending cylindrical beam 402 by belts 416. For example, as shown in FIG. 15, belts 416 can first wrap around one side of front longitudinally extending cylindrical beam 400, wrap around substantially all of rear longitudinally extending cylindrical beam 402, wrap around substantially all of front longitudinally extending cylindrical beam 400 and finally wrap around one side of rear longitudinally extending cylindrical beam 402. With the above wrapping configuration of belts 416 around and between front longitudinally extending cylindrical beam 400 and rear longitudinally extending cylindrical beam 402, for each full 360° relative revolution between front longitudinally extending cylindrical beam 400 and rear longitudinally extending cylindrical beam 402, front bushing 406, rear bushing 410, seat plate 418 and seat 22 will rotate one half of a full revolution, or 180°. However, as a practical matter, since the relative rotation between front longitudinally extending cylindrical beam 400 and rear longitudinally extending cylindrical beam 402 will probably not be a complete 360° revolution, but will more likely be a maximum of about 120°, the stepped down rotation of front bushing 406, rear bushing 410, seat plate 418 and seat 22 would then be about 60°.

While the preferred embodiments of the invention has been illustrated and described, it will be appreciated that various changes can be made therein without departing from the spirit and scope of the invention.

The embodiments of the invention in which an exclusive property or privilege is claimed are defined as follows:

1. A motor powered, wheeled personal transporter, comprising:
    a frame having a front longitudinally extending cylindrical beam attached to a front wheel assembly and a rear longitudinally extending cylindrical beam attached to a rear wheel assembly;
    bushing means connecting said front longitudinally extending cylindrical beam and said rear longitudinally extending cylindrical beam, said bushing means allowing independent rotation of said front longitudinally extending cylindrical mean and of said rear longitudinally extending cylindrical beam;
    seat means attached to said bushing means; and
    belt means attached to, and interwoven between, said front longitudinally extending cylindrical beam and said rear longitudinally extending cylindrical beam such that relative rotation between said front wheel assembly and said rear wheel assembly causes relative rotation between said front longitudinally extending cylindrical beam and said rear longitudinally extending cylindrical beam to rotate said seat means a lesser amount than the relative rotation between said front wheel assembly and said rear wheel assembly.

2. The personal transporter of claim 1, wherein said belt means is wrapped around one side of said front longitudinally extending cylindrical beam, is wrapped around substantially all of said rear longitudinally extending cylindrical beam, is wrapped around substantially all of said front longitudinally extending cylindrical beam and is wrapped around one side of said rear longitudinally extending cylindrical beam.

3. The personal transporter of claim 1 further comprising:
    electrical motor drive means mounted at each of said wheels;
    electrical direct current power source mounted on said transporter; and
    electrical power control means including user operated speed control for delivering a variable amount of said direct current power source to said electrical drive motors.

4. The personal transporter of claim 1, said front wheel assembly comprising separate left and right electric motor and gear subassemblies each including wheel axles, and means for mounting said motor and gear subassemblies on vertical pivots supported by said frame, and steering mechanism means for responding to user initiated electrical steering commands to jointly rotate said left and right hand motor and gear subassemblies on said vertical pivots to steer said front wheels.

5. The personal transporter of claim 1 further comprising rear axle adjustable strut assemblies including a pair of struts mounted in a horizontal plane and having forward ends joined by a collar to said frame and diverging rearwardly on opposed sides of the frame to rear ends connected by support brackets on said rear wheel assembly structurally tying together said rear wheel subassembly and said frame and including means for adjustably lengthening and shortening said struts for independent rear wheel alignment.

6. A motor powered, wheeled personal transporter, comprising:
    a frame with a seat thereon;
    a front wheel assembly attached to said frame, said front wheel assembly including a front base having a pair of vertical mounting tubes laterally spaced thereon, a pair of front motor and wheel assemblies each having a front housing and being secured to one of said vertical mounting tubes by mounting flanges on said housing that span said mounting tube and by a pin front fastened through said mounting tube, said front motor and wheel assemblies being horizontally pivotable with respect to said vertical mounting tubes by a horizontal tie rod interconnecting said motor and wheel assemblies; and
    a rear wheel assembly attached to said frame, said rear wheel assembly including a rear base having a spaced apart front flange and rear flange and a laterally extending support member adjacent said front flange, said rear wheel assembly also including a pair of rear motor and wheel assemblies each having a rear housing and being secured between said front flange and said rear flange of said base by a hollow tube on said housing and by a rear pin fastened through said front flange and said rear flange, said rear motor and wheel assemblies each further including a bracket on said rear housing securable to said laterally extending support member of said rear base.

7. The personal transporter of claim 6 further comprising:

electrical motor drive means mounted at each of said wheels;

electrical direct current power source mounted on said transporter; and electrical power control means including user operated speed control for delivering a variable amount of said direct current power source to said electrical drive motors.

8. The personal transporter of claim 6, said front wheel assembly comprising separate left and right electric motor and gear subassemblies each including wheel axles, and means for mounting said motor and gear subassemblies on vertical pivots supported by said frame, and steering mechanism means for responding to user initiated electrical steering commands to jointly rotate said left and right hand motor and gear subassemblies on said vertical pivots to steer said front wheels.

9. The personal transporter of claim 6 further comprising rear axle adjustable strut assemblies including a pair of struts mounted in a horizontal plane and having forward ends joined by a collar to said frame and diverging rearwardly on opposed sides of the frame to rear ends connected by support brackets on said rear wheel assembly structurally tying together said rear wheel subassembly and said frame and including means for adjustably lengthening and shortening said struts for independent rear wheel alignment.

10. The motor powered, wheeled personal transporter of claim 6, wherein said frame further comprises:

a front longitudinally extending cylindrical beam attached to a front wheel assembly and a rear longitudinally extending cylindrical beam attached to a rear wheel assembly;

bushing means connecting said front longitudinally extending cylindrical beam and said rear longitudinally extending cylindrical beam, said bushing means allowing independent rotation of said front longitudinally extending cylindrical beam and of said rear longitudinally extending cylindrical beam;

seat means attached to said bushing means; and belt means attached to, and interwoven between, said front longitudinally extending cylindrical beam and said rear longitudinally extending cylindrical beam such that relative rotation between said front wheel assembly and said rear wheel assembly causes relative rotation between said front longitudinally extending cylindrical beam and said rear longitudinally extending cylindrical beam to rotate said seat means a lesser amount than the relative rotation between said front wheel assembly and said rear wheel assembly.

11. The personal transporter of claim 10, wherein said belt means is wrapped around one side of said front longitudinally extending cylindrical beam, is wrapped around substantially all of said rear longitudinally extending cylindrical beam, is wrapped around substantially all of said front longitudinally extending cylindrical beam and is wrapped around one side of said rear longitudinally extending cylindrical beam.

12. The personal transporter of claim 10 further comprising:

electrical motor drive means mounted at each of said wheels;

electrical direct current power source mounted on said transporter; and electrical power control means including user operated speed control for delivering a variable amount of said direct current power source to said electrical drive motors.

13. The personal transporter of claim 10, said front wheel assembly comprising separate left and right electric motor and gear subassemblies each including, wheel axles, and means for mounting said motor and gear subassemblies on vertical pivots supported by said frame, and steering mechanism means for responding to user initiated electrical steering commands to jointly rotate said left and right hand motor and gear subassemblies on said vertical pivots to steer said front wheels.

14. The personal transporter of claim 10 further comprising rear axle adjustable strut assemblies including a pair of struts mounted in a horizontal plane and having forward ends joined by a collar to said frame and diverging rearwardly on opposed sides of the frame to rear ends connected by support brackets on said rear wheel assembly structurally tying together said rear wheel subassembly and said frame and including means for adjustably lengthening and shortening said struts for independent rear wheel alignment.

* * * * *

UNITED STATES PATENT AND TRADEMARK OFFICE
CERTIFICATE OF CORRECTION

PATENT NO. : 5,921,338
DATED : July 13, 1999
INVENTOR(S) : J.L. Edmondson

Page 1 of 2

It is certified that error appears in the above-identified patent and that said Letters Patent is hereby corrected as shown below:

| COLUMN | LINE | |
|---|---|---|
| Title Page [56] col. 1 | Ref. Cited: (U.S. Patents, item 4) | "3,299,992 1/1967 Trawywick should read --3,229,992 1/1966 Traywick--. |
| [56] col. 2 | Refs. Cited (Foreign Pats., item 2) | "wO" should read --WO-- |
| col. 2 | Attorney, Agent, or Firm | "Christensen O'Connor PLLC; Johnson & Kindness" should read --Christensen O'Connor Johnson & Kindness PLLC-- |
| 12 (Claim 1, | 3 line 11) | "mean" should read --beam-- |
| 12 (Claim 6, | 60 line 9) | Between "said" and "housing" insert --front-- |
| 12 (Claim 6, | 61 line 10) | "a pin front" should read --a front pin-- |
| 12 (Claim 6, | 65 line 14) | Between "said" and "motor" insert --front-- |

UNITED STATES PATENT AND TRADEMARK OFFICE
CERTIFICATE OF CORRECTION

PATENT NO. : 5,921,338
DATED : July 13, 1999
INVENTOR(S) : J.L. Edmondson

It is certified that error appears in the above-identified patent and that said Letters Patent is hereby corrected as shown below:

COLUMN         LINE

14                 34              After "including" delete ","
(Claim 13,    line 3)

Signed and Sealed this

Twenty-eighth Day of March, 2000

Attest:

Q. TODD DICKINSON

Attesting Officer        Commissioner of Patents and Trademarks